(12) United States Patent
Syllaios

(10) Patent No.: US 11,381,430 B2
(45) Date of Patent: Jul. 5, 2022

(54) PHASE/FREQUENCY TRACKING TRANSCEIVER

(71) Applicant: Cypress Semiconductor Corporation, San Jose, CA (US)

(72) Inventor: Ioannis Syllaios, Irvine, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 105 days.

(21) Appl. No.: 16/824,241

(22) Filed: Mar. 19, 2020

(65) Prior Publication Data

US 2021/0297296 A1    Sep. 23, 2021

(51) Int. Cl.
*H04B 1/44* (2006.01)
*H04L 27/00* (2006.01)
*H04B 1/403* (2015.01)

(52) U.S. Cl.
CPC ......... *H04L 27/0014* (2013.01); *H04B 1/403* (2013.01); *H04B 1/44* (2013.01); *H04L 2027/0016* (2013.01); *H04L 2027/0057* (2013.01); *H04L 2027/0069* (2013.01)

(58) Field of Classification Search
CPC ..... H04L 2027/0057; H04L 2027/0016; H04L 27/148; H04L 27/152; H04L 27/364; H04B 1/44; H04B 1/0082; H04B 1/38
See application file for complete search history.

(56) References Cited

U.S. PATENT DOCUMENTS

| | | | | | |
|---|---|---|---|---|---|
| 4,355,401 | A | * | 10/1982 | Ikoma | H04L 27/0008 375/216 |
| 5,260,975 | A | * | 11/1993 | Saito | H04L 1/0001 327/3 |
| 5,263,079 | A | * | 11/1993 | Umemoto | H04B 1/403 455/553.1 |
| 5,757,858 | A | | 5/1998 | Black et al. | |
| 7,558,556 | B1 | | 7/2009 | Moloudi et al. | |
| 8,194,785 | B2 | | 6/2012 | Zolfaghar et al. | |
| 8,204,107 | B2 | | 6/2012 | Zhuang et al. | |
| 8,244,193 | B2 | | 8/2012 | Pan | |
| 8,625,720 | B2 | | 1/2014 | Brueckmann et al. | |
| 8,755,461 | B2 | | 6/2014 | Shim et al. | |
| 9,319,051 | B2 | * | 4/2016 | Syllaios | H03L 7/1075 |

(Continued)

FOREIGN PATENT DOCUMENTS

EP    2101458 A1    9/2009

OTHER PUBLICATIONS

Single-Chip Blootooth Transceiver for Wireless Input Devices, Cypress Semiconductor Corporation, Oct. 4, 2016, 51 pages.

(Continued)

*Primary Examiner* — Rahel Guarino

(57) ABSTRACT

A radio frequency (RF) transceiver includes a reference signal source to generate a reference signal, a local RF source to generate a local RF signal and a mixed-signal phase/frequency detector to compare the reference signal to the local RF signal, and to generate a difference signal from the comparison, wherein the difference signal comprises a modulation component and an error component. The transceiver also includes a receiver front end to receive and downconverts an angle-modulated RF signal to a baseband signal, a quadrature modulator configured to angle-modulate the reference signal source with the baseband signal.

24 Claims, 7 Drawing Sheets

(56) References Cited

U.S. PATENT DOCUMENTS

| | | |
|---|---|---|
| 9,755,669 B2 | 9/2017 | Chen et al. |
| 9,929,885 B2 | 3/2018 | Purushothaman et al. |
| 10,491,304 B2 | 11/2019 | Agazzi et al. |
| 2009/0004981 A1 | 1/2009 | Eliezer et al. |
| 2014/0241462 A1 | 8/2014 | Bellaouar et al. |
| 2015/0139047 A1 | 5/2015 | Gärdenfors et al. |
| 2016/0337152 A1 | 11/2016 | Masui et al. |

OTHER PUBLICATIONS

Tobias Scholand, et al., A Real-Time Zero-Crossing Demodulation Concept, Springer Link, Oct. 27, 2006, 11 pages. https://link.springer.com/article/10.1007/s11277-006-9216-5.

* cited by examiner

PHASE/FREQUENCY TRACKING TRANSCEIVER

FIELD

The present disclosure is directed to phase/frequency tracking radio frequency transceivers and, more particularly, to low power transceivers for constant envelope modulation standards.

BACKGROUND

Constant-envelope phase/frequency modulation standards for wireless connectivity, such as Bluetooth Low Energy (BLE) and IEEE 802.15.4 ZigBee, are optimized for low power consumption, cost, and complexity and have enabled the deployment of wireless Internet-of-Things (IoT) technologies. A key component of IoT chipsets is the radio transceiver (TRX) where power consumption critically impacts battery life.

A conventional approach on the receiver (RX) side uses a digital/voltage controlled oscillator (D/VCO) as a local oscillator (LO) in a narrow bandwidth analog phase-locked loop (APLL) to track the frequency of the received radio frequency (RF) carrier. The resulting control voltage for the D/VCO includes frequencies outside of the loop bandwidth corresponding to the phase modulation on the RF carrier, which can be demodulated to recover the received data. However, this RX topology is subject to frequency pulling from strong interferers and poor sensitivity from downconverted LO phase noise. On the transmitter (TX) side, a conventional approach uses the D/VCO in a digital PLL (DPLL) to lock the D/VCO to a multiple of a stable reference oscillator frequency. This approach requires a wide bandwidth loop to modulate the D/VCO with the TX data, which increases phase noise. Additionally, these approaches do not provide phase coherence when switching between RX and TX modes, as needed for some applications, such as high accuracy distance measurement (HADM) in the Bluetooth standard.

SUMMARY

The present disclosure describes example apparatus, systems and methods in phase/frequency transceivers for the coherent reception and transmission of constant envelope radio frequency signals.

In one example, a radio frequency (RF) transceiver includes a reference signal source configured to generate a reference signal; a local RF source configured to generate a local RF signal; and a mixed-signal phase/frequency detector configured to compare the reference signal to the local RF signal, and to generate a difference signal from the comparison, where the difference signal includes a modulation component and an error component.

In one example, the RF transceiver also includes a receiver front end configured to receive and downconvert an angle-modulated RF signal to a baseband signal, and a quadrature modulator coupled with the receiver front end and the reference signal source, where the quadrature modulator is configured to angle-modulate the reference signal source with the baseband signal.

In one example of the RF transceiver, the mixed-signal phase/frequency detector comprises a fractional-N, delta-sigma phase/frequency detector (ΔΣ-PFD) configured to frequency divide the local RF signal, where the difference signal is derived from comparing zero crossings of the angle-modulated reference signal and zero crossings of the frequency divided local RF signal, and where the modulation component comprises a digitized baseband signal and the error component comprises a fractional control sequence.

In one example of the RF transceiver, the local RF source comprises a digitally-controlled oscillator (DCO), and the RF transceiver also includes: an adder coupled with the ΔΣ-PFD, where the adder is configured to generate a digital frequency error from a difference between the fractional control sequence and a fractional control number; an accumulator coupled with the adder, configured to generate a digital phase error from the digital frequency error; and a digital loop filter (DLF) configured to select the digital phase error, where the digital phase error is adapted to phase-lock the DCO to the reference signal.

In one example, the RF transceiver also includes a digital demodulator coupled with the ΔΣ-PFD, where the digital demodulator is configured to decode the digitized baseband signal to recover a stream of received data bits.

In one example of an RF transceiver, the local RF source comprises a digitally-controlled oscillator (DCO) configured to be angle-modulated by a digitized baseband signal.

In one example of an RF transceiver, the mixed-signal phase/frequency detector comprises a fractional-N, delta-sigma phase/frequency detector (ΔΣ-PFD), configured to frequency divide the angle-modulated local RF signal, where the difference signal is derived from comparing zero crossings of the reference signal and zero crossings of the frequency divided, angle-modulated local RF signal, and where the modulation component comprises the digitized baseband signal and the error component comprises a fractional control sequence.

In one example, the RF transceiver also includes: a first adder coupled with the ΔΣ-PFD, configured to generate a digital frequency error from a difference between the fractional control sequence and a fractional control number; an accumulator coupled with the first adder, configured to generate a digital phase error from the digital frequency error; and a digital loop filter (DLF) configured to select the digital phase error, wherein the digital phase error is adapted to phase-lock the DCO to the reference signal.

In one example, the RF transceiver also includes a digital modulator coupled with the first adder and with a second adder coupled between the DLF and the DCO, where the digital modulator is configured to encode a sequence of transmit data bits into the digitized baseband signal, where the digitized baseband signal from the ΔΣ-PFD is canceled in the first adder by the digitized baseband signal from the digital modulator, and where the digitized baseband signal from the digital modulator is added to the digital phase error signal in the second adder to modulate the DCO with the digitized baseband signal.

In one example, the RF transceiver also includes a power amplifier (PA) coupled with the DCO, to amplify the signal from the digital baseband modulated DCO.

In one example, a method in an RF transceiver includes comparing a reference signal from a reference source to a local radio frequency (RF) signal in a mixed-signal phase/frequency detector; generating a difference signal from the comparison, where the difference signal includes a modulation component and an error component; and phase-locking the local RF signal to the reference signal with the error component to perform angle demodulation for RF receiving and angle modulation for RF transmitting.

In one example, the method also includes receiving and downconverting an angle-modulated RF signal to a baseband signal in a receiver front end, and angle-modulating the reference source with the baseband signal to generate an angle-modulated reference signal.

In one example of the method, the mixed signal phase/frequency detector comprises a fractional-N, delta-sigma phase/frequency detector (ΔΣ-PFD) configured to frequency-divide the local RF signal, where the difference signal is derived from comparing zero crossings of the angle-modulated reference signal with zero crossings of the frequency-divided local RF signal.

In one example of the method, the modulation component comprises a digitized baseband signal and the error component comprises a fractional control sequence.

In one example of the method, the local RF signal is generated by a digitally-controlled oscillator (DCO), and the method also includes generating a digital frequency error from a difference between the fractional control sequence and a fractional control number; accumulating the digital frequency error to generate a digital phase error; and selecting the digital phase error with a digital loop filter (DLF), where phase-locking the local RF signal to the reference signal comprises tuning the DCO with the digital phase error.

In one example, the method also includes demodulating the digital baseband signal to recover a stream of received data bits.

In one example, a method in an RF transceiver includes angle-modulating a local RF signal source with a digitized baseband signal to generate the local RF signal.

In one example of the method, the mixed-signal phase/frequency detector comprises a fractional-N, delta-sigma phase/frequency detector (ΔΣ-PFD) configured to frequency-divide the local RF signal, where the difference signal is derived from comparing zero crossings of the reference signal with zero crossings of the frequency-divided angle-modulated local RF signal, and where the modulation component comprises the digitized baseband signal and the error component comprises a fractional control sequence.

In one example of the method, the local RF signal source comprises a digitally-controlled oscillator (DCO), and the method also includes: generating a digital frequency error from a difference between the fractional control sequence and a fractional control number; accumulating the digital frequency error to generate a digital phase error; and selecting the digital phase error with a digital loop filter (DLF), where phase-locking the local RF signal to the reference signal comprises tuning the DCO with the digital phase error.

In one example of the method, angle-modulating the local RF signal source includes: encoding a stream of data bits in a digital modulator to generate the digitized baseband signal; combining the digitized baseband signal with the digital phase error at a digital control input of the DCO; and tuning the DCO with the digitized baseband signal.

In one example, the method also includes amplifying the angle-modulated local RF signal, and transmitting the amplified angle-modulated local RF signal.

In one example, an RF transceiver system includes any one of the example RF transceivers described above, coupled with an antenna configured to transmit and receive angle-modulated RF signals.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes examples of systems and method for coherently modulating and demodulating angle-modulated (i.e., constant envelope) radio frequency signals using phase/frequency tracking transceivers.

Figure 1:
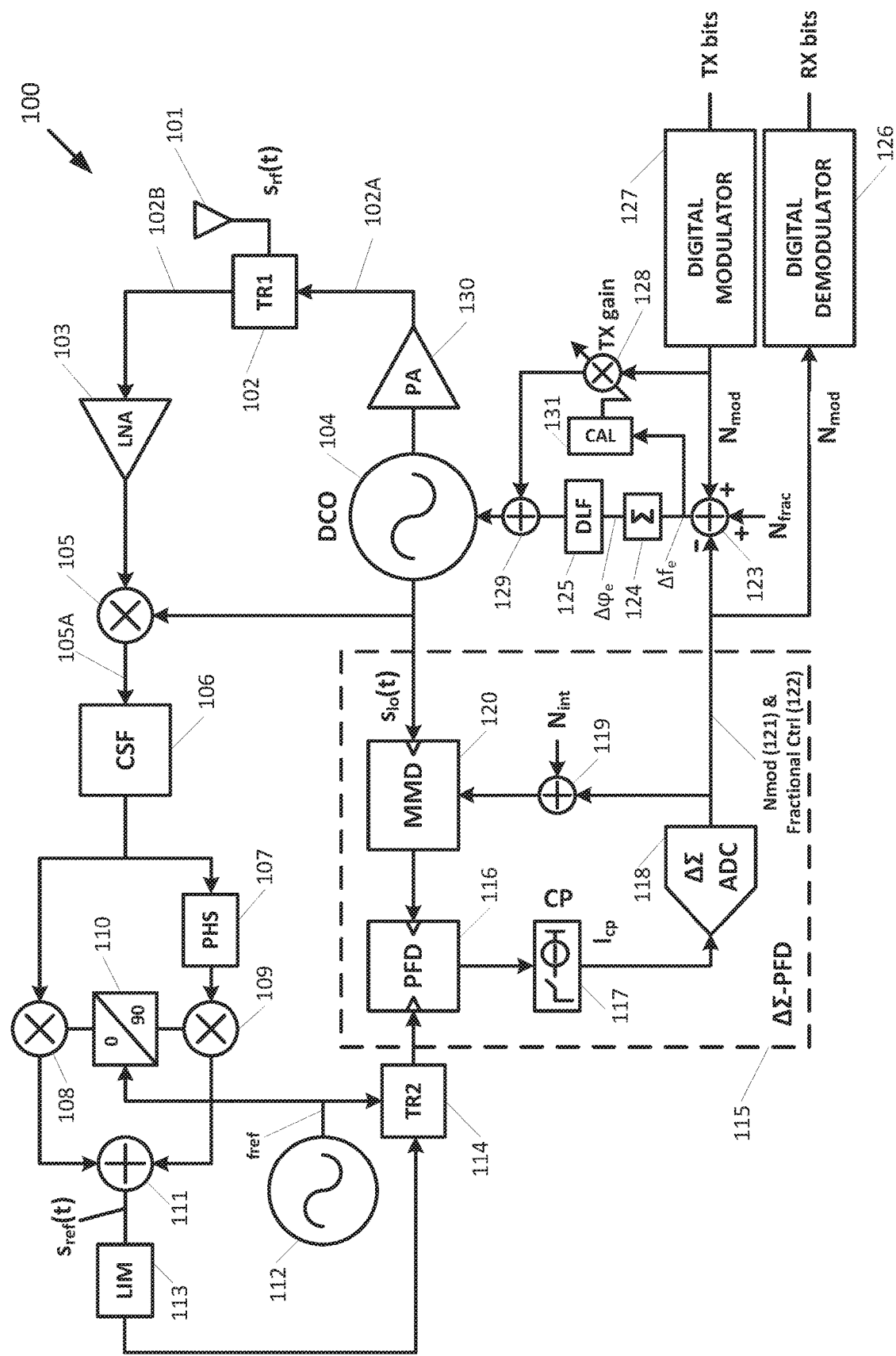
FIG. 1 is a block diagram illustrating an example transceiver according to the present disclosure.

FIG. 1 is a block diagram illustrating an example phase/frequency tracking transceiver 100 according to the present disclosure. Transceiver 100 is coupled to an antenna 101 to transmit and receive angle-modulated RF carrier signals (signals 102A and 102B, respectively). Antenna 101 is connected to a first transmit/receive switch (TR1), 102 which selects between transmit and receive modes. The receive chain (receiver front end) includes a low noise amplifier (LNA) 103, a digitally controlled local oscillator (DCO) 104, a mixer 105 and a channel selection filter (CSF) 106. The frequency of the DCO 104 is selected and controlled to generate a zero (or low frequency) intermediate frequency (IF) baseband signal 105A at the output of mixer 105. The CSF 106 is configured to filter out unwanted noise and interference from the baseband signal.

The output of CSF 106 is coupled to a quadrature phase modulator that includes a 90-degree phase shifter 107, mixers 108 and 109, a 0/90-degree phase shifter 110 and an adder 111.

In receive mode, a stable (e.g., crystal controlled) reference oscillator 112 is used to provide a reference signal ($f_{ref}$), via the 0/90-degree phase shifter 110, that is modulated by the quadrature modulator with the baseband signal. As a result of the quadrature mixing, the output $S_{ref}(t)$ at the output of adder 111 carries the angle modulation of the original RF input signal at the frequency ($f_{ref}$) of the reference oscillator 112.

The output of adder 111, $S_{ref}(t)$, is limited by limiter 113 to generate a constant amplitude sequence of pulses corresponding to zero crossings that track the phase shifts of the angle modulated reference oscillator 112. In receive mode, a second transmit/receive switch (TR2) 114 connects the output of limiter 113 to one input of a mixed signal (e.g., hybrid analog/digital) phase/frequency detector, which may be a fractional-N delta-sigma phase/frequency detector (ΔΣ-PFD) 115. The ΔΣ-PFD 115 includes a phase-frequency detector (PFD) 116, a charge pump (CP) 117, a delta-sigma analog to digital converter (ΔΣ-ADC) 118, an adder 119 and a multi-modulus divider (MMD) 120. A second input of the ΔΣ-PFD 115 receives the local oscillator signal $S_{LO}(t)$ from the DCO 104.

The ΔΣ-PFD 115 compares the phase of the baseband modulated (i.e., angle-modulated) reference oscillator signal with the phase of a divided down version of the DCO signal $S_{LO}(t)$ from MMD 120, and locks the frequency of the DCO 104 to $(N_{int}+N_{frac})\cdot f_{ref}$, where $N_{int}$ (an integer value) and $N_{frac}$ (a fractional value) are determined by the carrier frequency of a selected RF channel. The signal $S_{LO}(t)$ can be mathematically described as:

$$S_{LO}(t)=A_{LO}\cos(2\pi f_{LO}t+\int 2\pi \Delta f_m(\tau)d\tau)$$

Where $f_{LO}$ is the RF carrier frequency, $\Delta f_m = N_{mod} f_{ref}$, where $N_{mod}$ is a digitized baseband signal, and $A_{LO}$ is the amplitude of the signal envelope.

The MMD 120 performs fractional-N division of the DCO 104 local oscillator input by $N_{int}+\{\ldots, -1, 0, 1, \ldots\}$, where $\{\ldots, -1, 0, 1, \ldots\}$ reflects the long-term fractional division control of the MMD 120 averaging over time to a value $N_{frac}$, and the PFD/CP combination produces the phase error between the divided DCO 104 input and the reference oscillator signal $f_{ref}$ in the form of an $f_{ref}$-rate pulse-width modulated (PWM) current signal ($I_{cp}$). The ΔΣ-ADC 118 digitizes the $I_{cp}$ signal. An $L^{th}$-order ΔΣ-ADC implements an $(L+1)^{th}$ order ΔΣ-PFD by virtue of closing the loop within the ΔΣ-PFD.

The output of the ΔΣ-PFD 115 includes the digitized baseband modulation component, $N_{mod}$ (121), and a digitized error component comprising a fractional control sequence 122 that averages to the required value of $N_{frac}$ over time. The fractional control sequence 122 is combined with $N_{int}$ in adder 119 and fed back to MMD 120 to set the instantaneous divider value of MMD 120 at each $f_{ref}$ clock cycle. The fractional control sequence 122 is also provided to adder 123, where it is subtracted from $N_{frac}$ at each clock cycle to generate a frequency error $\Delta f_e$. The sequential values of $\Delta f_e$ are accumulated in an accumulator 124, which integrates the frequency error into phase error. The phase error signal is passed by digital loop filter (DLF) 125, which has a bandwidth greater than the frequency of the phase error signal. However, the bandwidth of the DLF 125 is below the bandwidth of the modulation $N_{mod}$, so that the DCO is not affected by $N_{mod}$. Rather $N_{mod}$ is directed to a digital demodulator 126, which extracts the RX bits.

Figure 2:
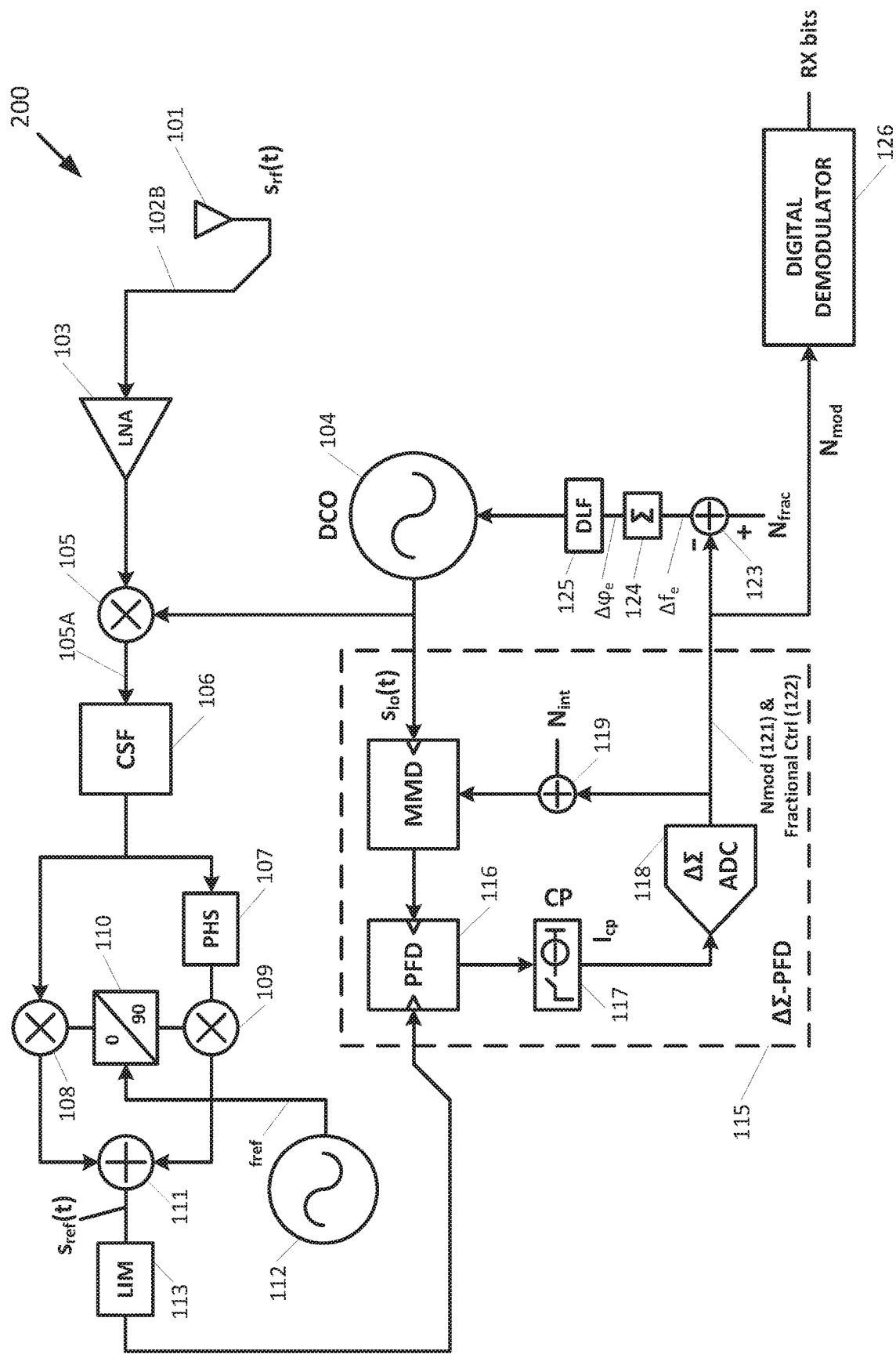
FIG. 2 is a block diagram illustrating the example transceiver of FIG. 1 in receive mode.

For clarity, FIG. 1 is reproduced in part as system 200 in FIG. 2, illustrating only the components used when system 100 is configured as a receiver. As noted above, the ΔΣ-PFD 115 includes a PFD 116 and a CP 117, which are analog components. The PFD 116 generates voltage pulses with widths corresponding to the phase difference between the baseband modulated reference oscillator signal from limiter 113 and the divided down version of the local oscillator signal from DCO 104, provided by MMD 120. The charge pump 117 converts the voltage pulses into pulse width modulated (PWM) current pulses $I_{cp}$ to drive the ΔΣ-ADC 118. The ΔΣ-ADC 118 digitizes the current pulses into the digitized baseband signal 121 (modulation component) and the fractional control sequence 122 (error component) that controls the MMD 120 in conjunction with $N_{int}$. Thus, the ΔΣ-PFD 115 is implemented as a hybrid analog-digital frequency/phase detector.

Figure 3A:
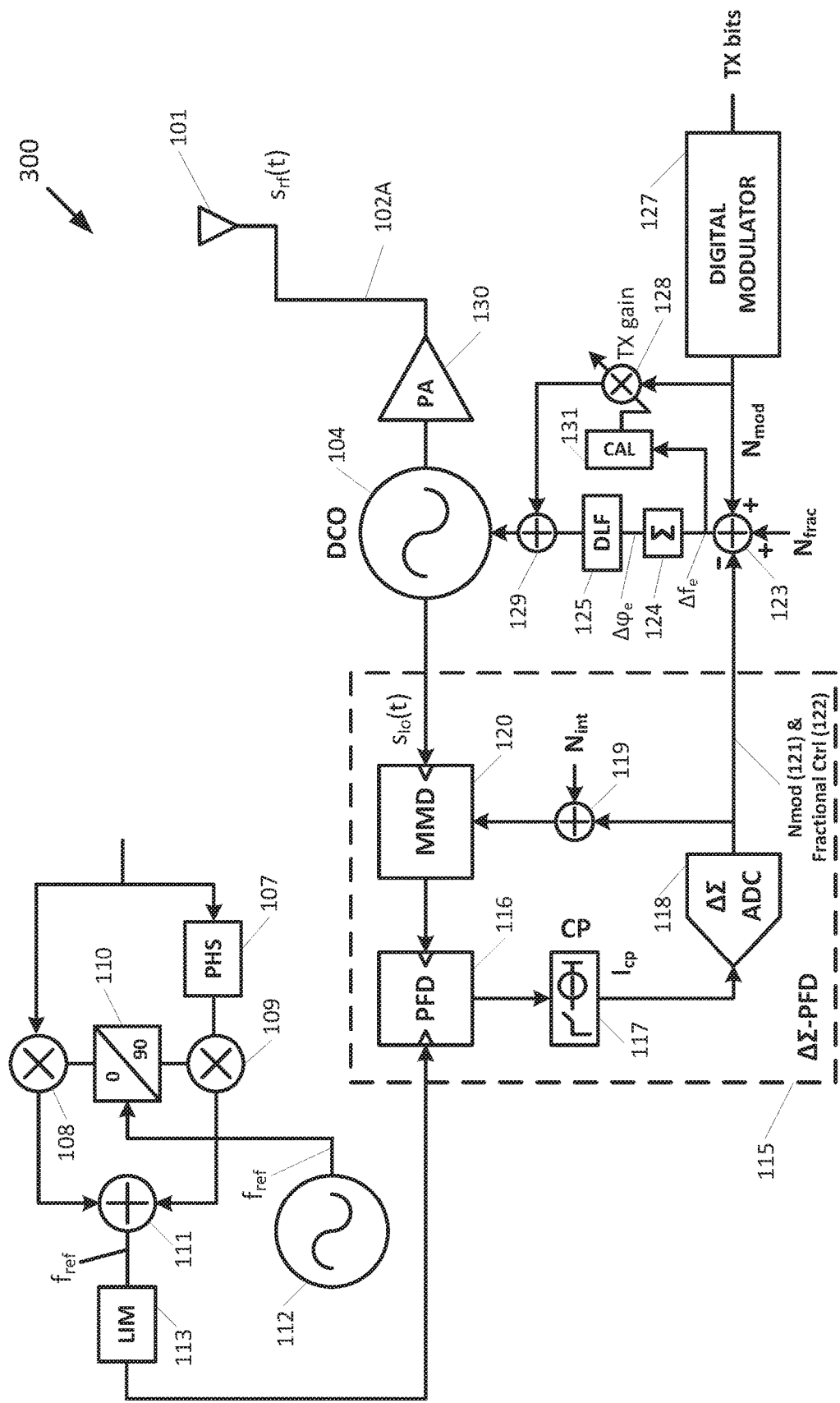
FIG. 3A is a block diagram illustrating the example transceiver of FIG. 1 in a first transmit mode.

FIG. 1 is reproduced in part as system 300 in FIG. 3A, illustrating only the components used when system 100 is configured as a transmitter when transmit/receive phase coherence is required. In particular, the LNA 103, mixer 105 and CDF 106 are not used in transmit mode and can be disabled to reduce power consumption. In FIG. 3A, data to be transmitted (TX bits) are converted to the digitized baseband signal $N_{mod}$ by digital modulator 127. $N_{mod}$ from digital modulator 127 is coupled to DCO 104 through a transmit gain controller 128 and adder 129, where it modulates DCO 104. The modulated signal $S_{LO}(t)$ from DCO 104 is provided as one input to ΔΣ-PFD 115. $N_{mod}$ from digital modulator 127 is also coupled to adder 123 where it is cancelled by the digitized baseband signal $N_{mod}$ 121 from the ΔΣ-PFD 115.

In TX mode with phase coherence, as illustrated in FIG. 3A, the reference oscillator 112 is still connected to the quadrature modulator (as in the RX mode). However, since there is no baseband signal from the receiver front end, the output of the quadrature modulator is simply $f_{ref}$, the signal from reference oscillator 112. This signal is limited by limiter 113 and directly to the PFD 114 of ΔΣ-PFD 115 via transmit/receive switch TR2 (not shown). This mode of operation allows the transceiver to switch from receive mode to transmit mode without switching the connection of the reference oscillator, which provides phase coherence.

As noted above, signal $S_{LO}(t)$ from DCO 104 is provided to MMD 120. As in the case of the receive mode operation, the PFD 116 compares the reference oscillator signal $f_{ref}$, provided by reference oscillator 112, with the modulated signal from DCO 104 divided down in frequency by MMD 120. The PFD 116 and the CP 117 produce a sequence of pulse width modulated (PWM) current pulses $I_{cp}$ based on the phase differences between the reference oscillator signal (fref) and the divided down DCO signal, which is modulated by $N_{mod}$ as described above. Accordingly, the digitized output of the ΔΣ-ADC 118 includes both the fractional control sequence 122 that represents the difference between $N_{int}$ and $N_{frac}$, and the digital modulation $N_{mod}$ 121. The fractional control sequence 122 is combined with $N_{int}$ in adder 119 to adjust the instantaneous divider ratio of MMD 120 with each clock cycle of reference oscillator 112.

The digitized baseband modulation data $N_{mod}$ 121 and the fractional control sequence 122 from ΔΣ-ADC 118 are coupled to adder 123. As noted above, the digital baseband signals ($N_{mod}$) from the ΔΣ-PFD 115 and the digital modulator 127 cancel out, but the fractional control sequence 122 is differenced with $N_{frac}$ on a clock cycle by clock cycle basis, and the difference between the fractional control sequence 122 and the fractional control number $N_{frac}$ appears as the digital frequency error signal $\Delta f_e$. As described above with respect to the receive mode of operation, the digital frequency error signal $\Delta f_e$ is integrated by accumulator 124 into an accumulated digital phase error $\Delta\phi_e$. The digital phase error $\Delta\phi_e$ corresponding to the error between $N_{frac}$ and the fractional control sequence 122 is passed by the narrowband digital loop filter 125, where it is combined in adder 129 with the gain adjusted digital $N_{mod}$ signal from a wideband TX gain controller 128, to drive the DCO 104 into phase-lock with the reference oscillator 112, and to modulate the DCO 104 with the digitized transmission data $N_{mod}$. This approach, using a narrowband loop to control the center RF frequency of the signal source (DCO 104), and a wideband path outside of the loop to modulate the signal source is known as two-point modulation. The modulated DCO signal is then coupled to the power amplifier (PA) 130 through TR switch 102 and the amplified signal is transmitted by antenna 101.

Figure 3B:
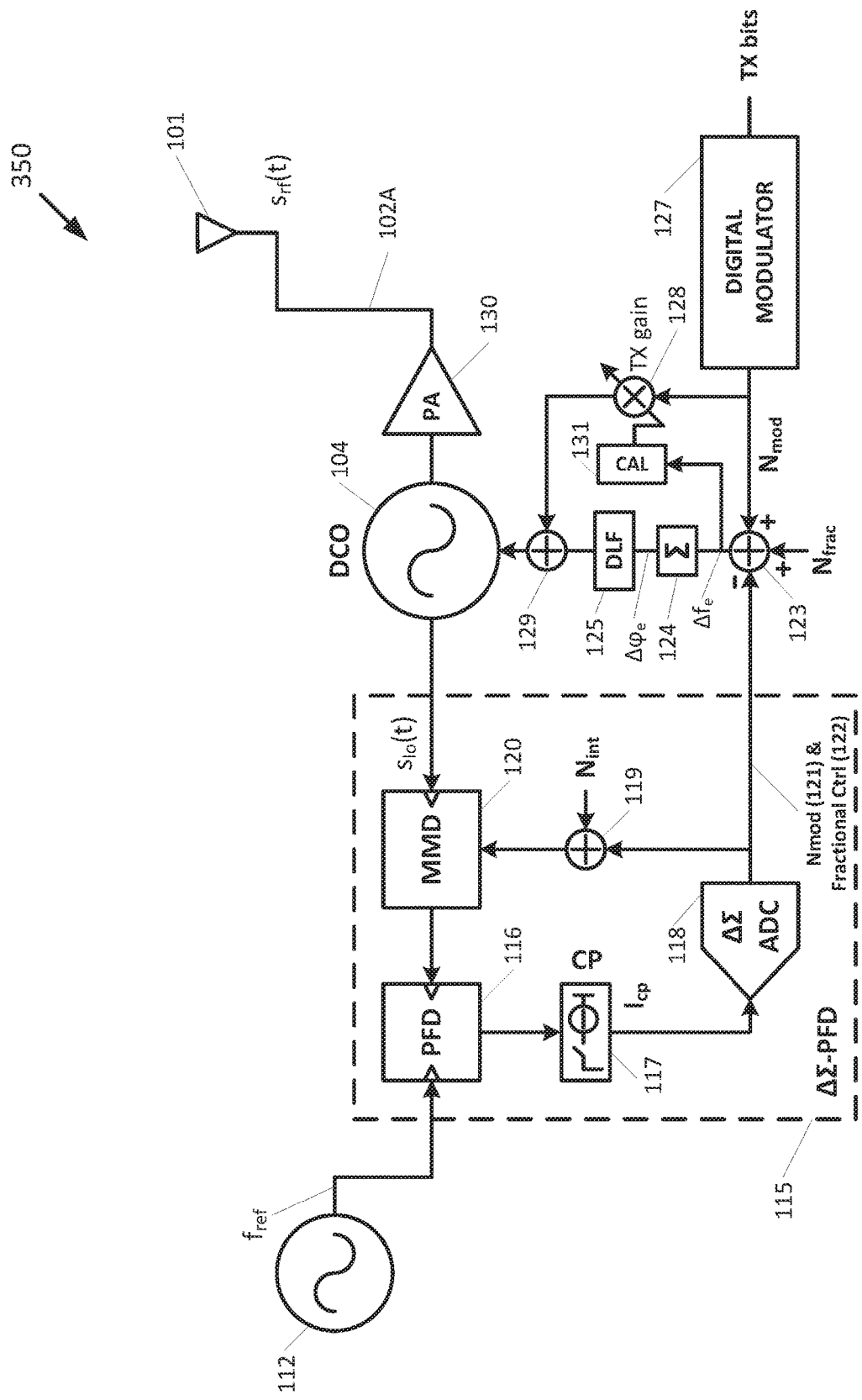
FIG. 3B is a block diagram illustrating the example transceiver of FIG. 1 in a second transmit mode.

FIG. 1 is reproduced in part as system 350 in FIG. 3B, illustrating only the components used when system 100 is configured as a transmitter when transmit/receive phase coherence is not required. As illustrated in FIG. 3B, the connection of the reference oscillator 112 is switched from the quadrature modulator to a direct connection with the ΔΣ-PFD 115. This allows the components of the quadrature modulator to be powered down to reduce overall power consumption.

As in the case of system 300 of FIG. 3A, data to be transmitted (TX bits) are converted to the digitized baseband signal $N_{mod}$ by digital modulator 127. $N_{mod}$ from digital modulator 127 is coupled to DCO 104 through a transmit gain controller 128 and adder 129, where it modulates DCO 104. The modulated signal SLO(t) from DCO 104 is provided as one input to ΔΣ-PFD 115. $N_{mod}$ from digital modulator 127 is also coupled to adder 123 where it is cancelled by the digitized baseband signal $N_{mod}$ 121 from the ΔΣ-PFD 115.

As noted above, signal $S_{LO}(t)$ from DCO 104 is provided to MMD 120. The PFD 116 compares the reference oscillator signal $f_{ref}$, provided by reference oscillator 112, with the modulated signal from DCO 104 divided down in frequency by MMD 120. The PFD 116 and the CP 117 produce a sequence of pulse width modulated (PWM) current pulses $I_{cp}$ based on the phase differences between the reference oscillator signal (fref) and the divided down DCO signal, which is modulated by $N_{mod}$ as described above. Accordingly, the digitized output of the ΔΣ-ADC 118 includes both the fractional control sequence 122 that represents the difference between $N_{int}$ and $N_{frac}$, and the digital modulation $N_{mod}$ 121. The fractional control sequence 122 is combined with $N_{int}$ in adder 119 to adjust the instantaneous divider ratio of MMD 120 with each clock cycle of reference oscillator 112.

The digitized baseband modulation data $N_{mod}$ 121 and the fractional control sequence 122 are coupled to adder 123. As noted above, the digital baseband signals ($N_{mod}$) from the ΔΣ-PFD 115 and the digital modulator 127 cancel out, but the fractional control sequence 122 is differenced with $N_{frac}$ on a clock cycle by clock cycle basis (at the rate $f_{ref}$ of reference oscillator 112), and the difference between the fractional control sequence 122 and the fractional control number $N_{frac}$ appears as the digital frequency error signal $\Delta f_e$. As described above, the digital frequency error signal $\Delta f_e$ is integrated by accumulator 124 into an accumulated digital phase error $\Delta \phi_e$. The digital phase error $\Delta \phi_e$ corresponding to the error between $N_{frac}$ and the fractional control sequence 122 is passed by the narrowband digital loop filter 125, where it is combined in adder 129 with the gain adjusted digital $N_{mod}$ signal from a wideband TX gain controller 128, to drive the DCO 104 into phase-lock with the reference oscillator 112, and to modulate the DCO 104 with the digitized transmission data $N_{mod}$. The modulated DCO signal is then coupled to the power amplifier (PA) 130 through TR switch 102 (not shown) and the amplified signal is transmitted by antenna 101.

While the closed loop operation described herein operates to drive the digital frequency error $\Delta f_e$ toward zero, there are variations in the DCO's digital gain ($K_{dco}$ in Hertz per least significant bit) due to process, voltage and temperature (PVT) variations that result in residual $\Delta f_e$. The latter serves as an error signal to adaptively track the DCO gain, effectively eliminating its process-voltage-temperature (PVT) variations and maximizing the transmit path bandwidth that cannot be directly corrected by the normal operation of the loop. Accordingly, any residual digital frequency error Δfe is processed by the calibration module (CAL) 131 to correct the transmission gain with TX gain module 128 for such variations.

Figure 4:
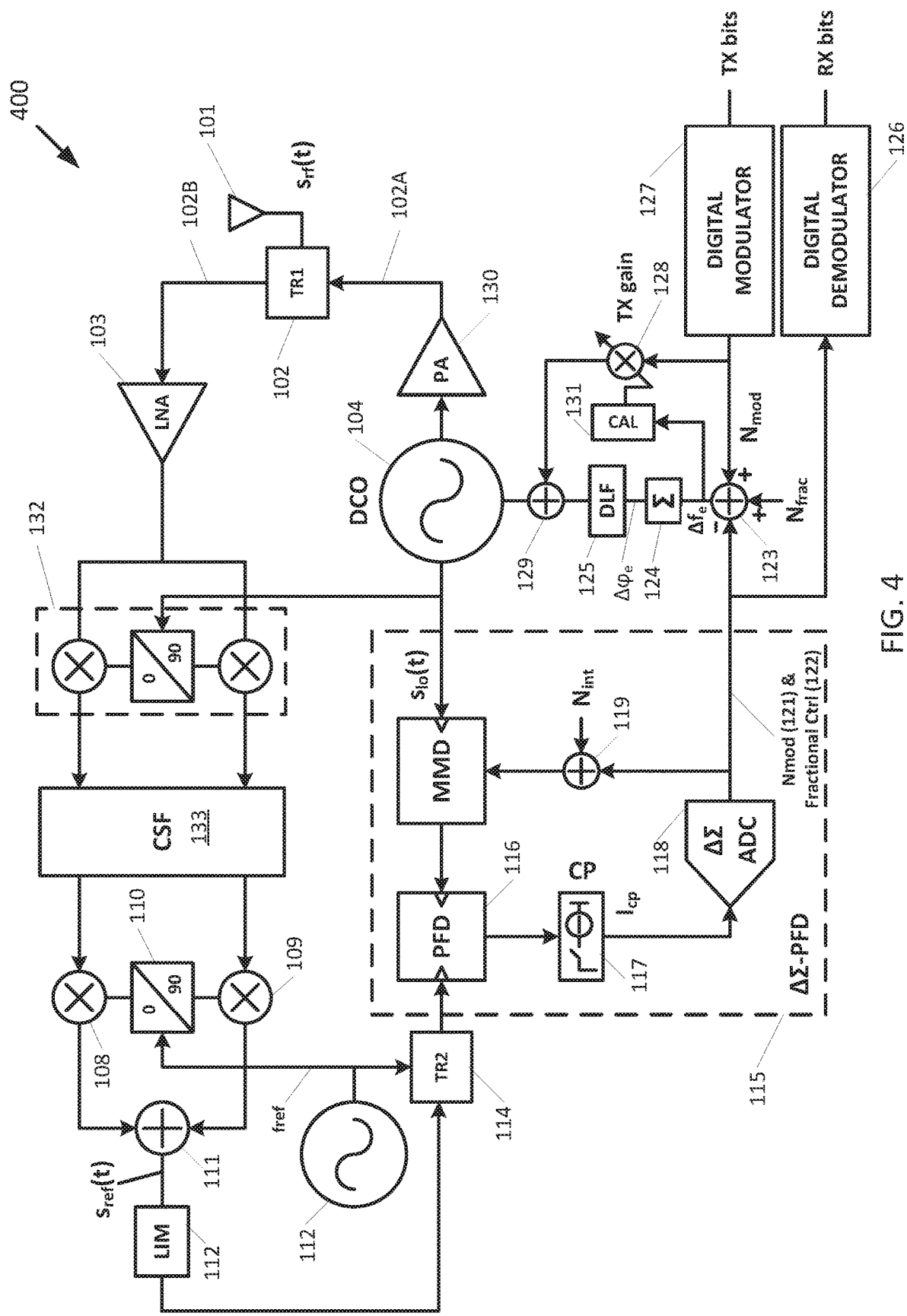
FIG. 4 is a block diagram illustrating an example transceiver according to the present disclosure.

FIG. 4 is a block diagram illustrating another example phase/frequency tracking transceiver 400 according to the present disclosure. System 400 is similar in most respects to system 100, as indicated by the like reference designators in system 100 and system 400. The transceiver illustrated in FIG. 4 replaces the single-channel mixer 105 and CSF 106 of system 100 with a quadrature mixer 132 and complex CSF 133, respectively, eliminating the need for 90-degree phase shifter 107 for the secondary mixing operation.

Figure 5:
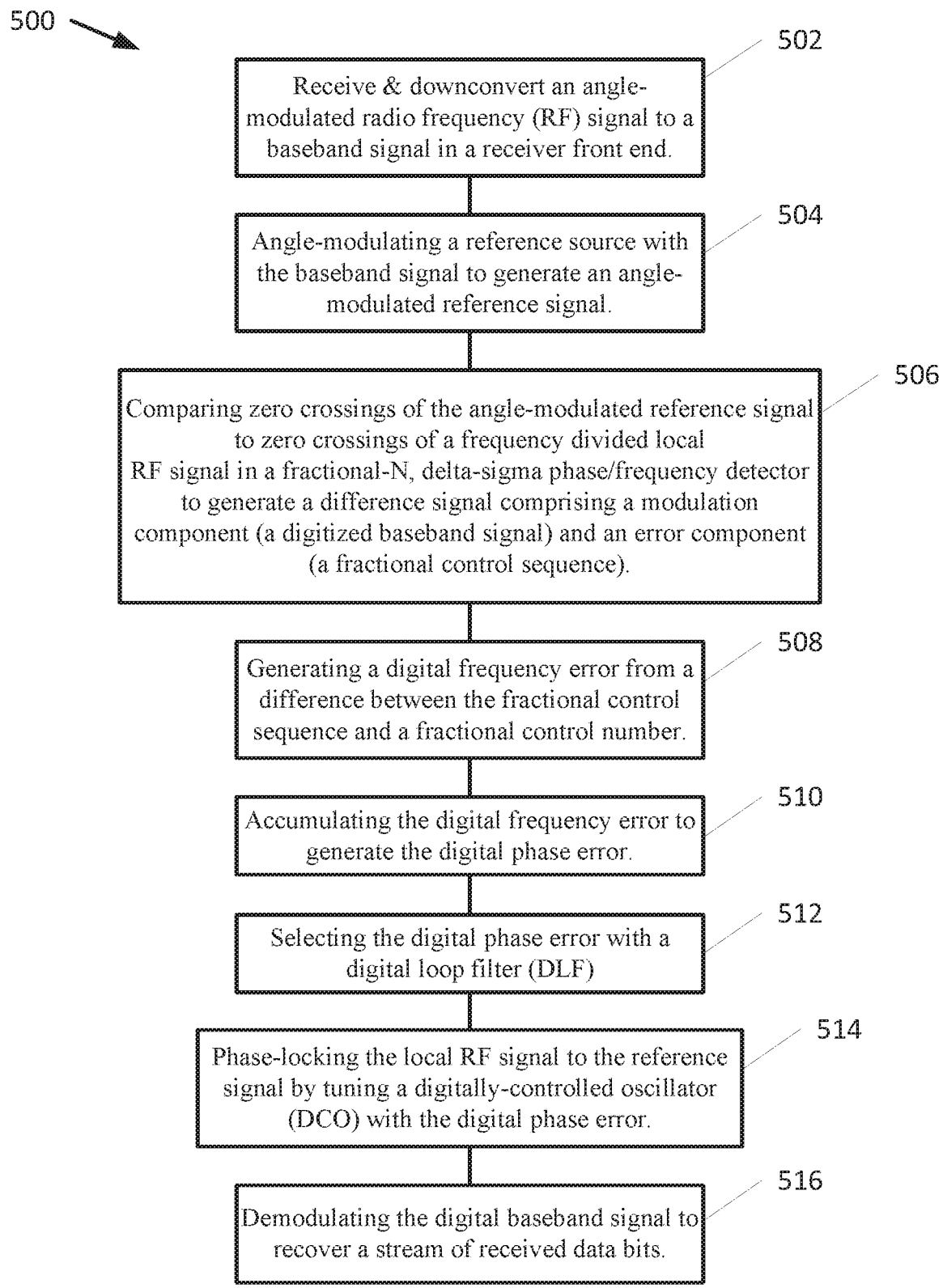
FIG. 5 is a flowchart illustrating an example method for implementing a receiver in a phase/frequency tracking transceiver according to the present disclosure.

FIG. 5 is a flowchart illustrating an example method 500 for receiving an angle-modulated radio frequency signal in a phase/frequency tracking transceiver according to the present disclosure. With reference to FIG. 2, method 500 begins at operation 502, receiving & downconverting an angle-modulated radio frequency (RF) signal (e.g., 102B) to a baseband signal (e.g., 105A) in a receiver front end (e.g., antenna 101, LNA 103, and mixer 105). Method 500 continues at operation 504, angle-modulating a reference source (e.g., reference source 112) with the baseband signal to generate an angle-modulated reference signal. (e.g., Sref(t)). Next, method 500 continues at operation 506, comparing zero crossings of the angle-modulated reference signal to zero crossings of a frequency divided local RF signal (e.g., $S_{LO}(t)$) in a fractional-N, delta-sigma phase/frequency detector, to generate a difference signal comprising a modulation component (e.g., digitized baseband signal $N_{mod}$ 121) and an error component (e.g., fractional control sequence 122). In one example, method 500 continues at operation 508: generating a digital frequency error (e.g., $\Delta f_e$) from a difference between the fractional control sequence (e.g., 122) and a fractional control number (e.g., $N_{frac}$); at operation 510: accumulating the digital frequency error (e.g., in accumulator 124) to generate the digital phase error signal $\Delta \phi_e$; at operation 512: selecting the digital phase error (e.g., $\Delta \phi_e$) with a digital loop filter (e.g., DLF 125); at operation 514: phase-locking local RF signal to the reference signal (e.g., $f_{ref}$) by tuning a digitally-controlled oscillator (e.g., DCO 104) with the digital phase error; and at operation 516: demodulating the digital baseband signal in digital demodulator (e.g., demodulator 126) to recover a stream of received (RX) data bits.

Figure 6:
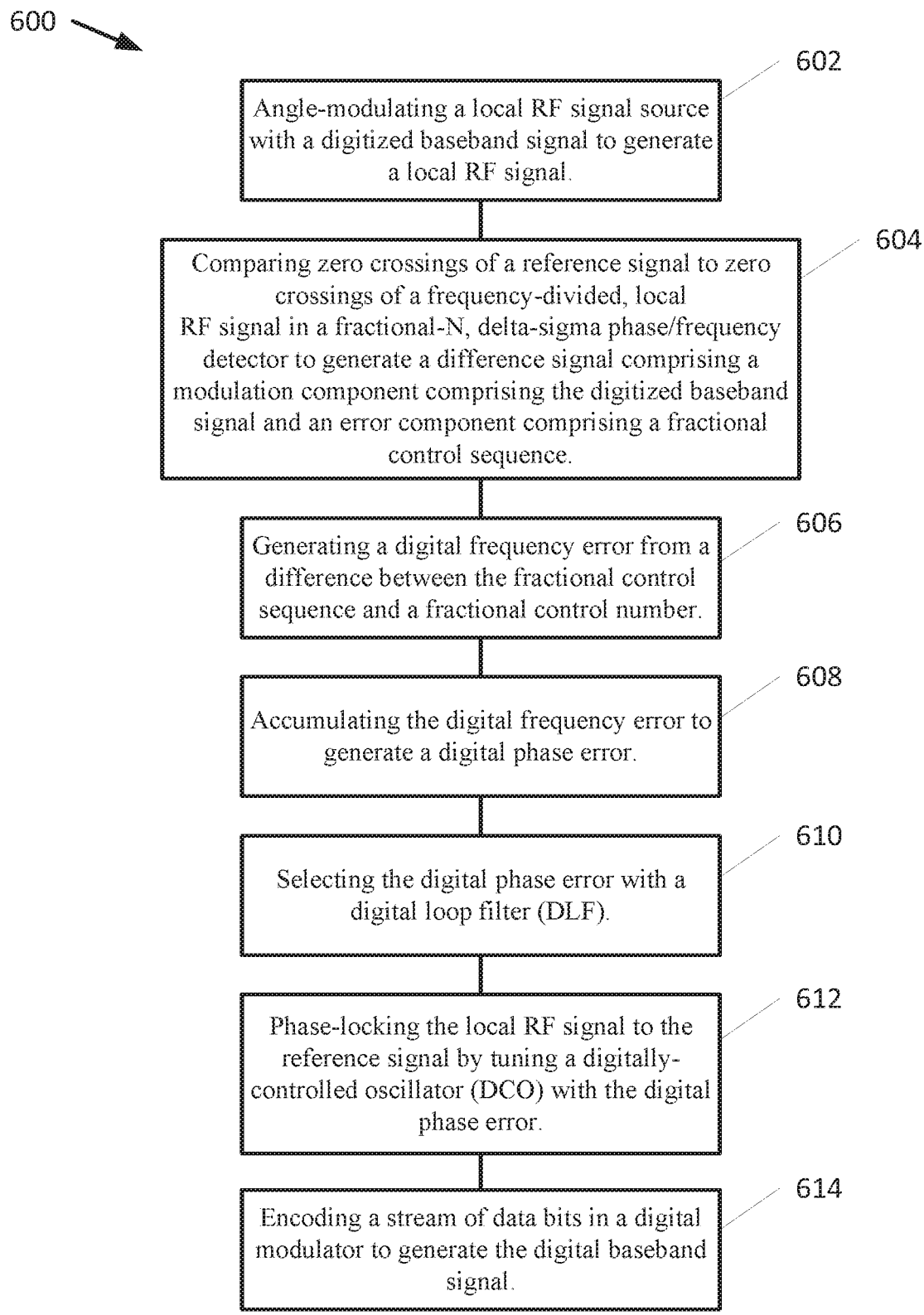
FIG. 6 is a flowchart illustrating an example method for implementing a transmitter in a phase/frequency tracking transceiver according to the present disclosure.

FIG. 6 is a flowchart illustrating an example method 600 for transmitting angle-modulated RF signals in a phase/frequency tracking transceiver according to the present disclosure. With reference to FIG. 3, method 600 begins at operation 602, angle-modulating a digitally-controlled oscillator (e.g., DCO 104) with a digitized baseband signal (e.g., $N_{mod}$). Method 600 continues at operation 604, comparing zero crossings of the reference signal to zero crossings of a frequency-divided, angle-modulated local RF signal in a fractional-N, delta-sigma phase/frequency detector, to generate a difference signal comprising a modulation component (e.g., the digitized baseband signal, $N_{mod}$ 121) and an error component (e.g., the fractional control sequence 122). Next, method 600 continues at operation 606, generating a digital frequency error (e.g., $\Delta f_e$) from a difference (e.g., in adder 123) between the fractional control sequence and a fractional control number (e.g., $N_{frac}$). Method 600 continues at operation 608: accumulating the digital frequency error (e.g., in accumulator 124) to generate a digital phase error $\Delta \phi_e$; at operation 610: selecting the digital phase error with a digital loop filter (e.g., DLF 125); at operation 612: where the local RF source is a digitally-controlled oscillator (DCO), phase-locking the local RF signal to the reference signal by tuning the DCO with the digital phase error; and at operation 614: encoding a stream of transmit (TX) data bits in a digital modulator (e.g., 127) to generate the digital baseband signal (e.g., $N_{mod}$).

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated examples of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. As used in this application, the terms "coupled to" or "coupled with" in the context of connected components or systems, includes both directly coupled components or systems, and components or systems that are indirectly coupled through other components, systems of interfaces.

What is claimed is:

1. A radio frequency (RF) transceiver, comprising:
    a reference signal source configured to generate a reference signal;
    a local RF source configured to generate a local RF signal; and
    a mixed-signal phase/frequency detector configured to compare the reference signal to the local RF signal, and to generate a difference signal from the comparison, wherein the difference signal comprises a modulation component and an error component.

2. The RF transceiver of claim 1, further comprising
    a receiver front end configured to receive and downconvert an angle-modulated RF signal to a baseband signal;
    a quadrature modulator coupled with the receiver front end and the reference signal source, wherein the quadrature modulator is configured to angle-modulate the reference signal source with the baseband signal; and
    a limiter coupled with the quadrature modulator to limit the angle-modulated reference signal.

3. The RF transceiver of claim 2,
    wherein the mixed-signal phase/frequency detector comprises a fractional-N, delta-sigma phase/frequency detector ($\Delta\Sigma$-PFD) configured to frequency divide the local RF signal, wherein the difference signal is derived from comparing zero crossings of the angle-modulated reference signal and zero crossings of the frequency divided local RF signal, and
    wherein the modulation component comprises a digitized baseband signal and the error component comprises a fractional control sequence.

4. The RF transceiver of claim 3, wherein the local RF source comprises a digitally-controlled oscillator (DCO), the RF transceiver further comprising:
    an adder coupled with the $\Delta\Sigma$-PFD, configured to generate a digital frequency error from a difference between the fractional control sequence and a fractional control number;
    an accumulator coupled with the adder, configured to generate a digital phase error from the digital frequency error; and
    a digital loop filter (DLF) configured to select the digital phase error, wherein the digital phase error is adapted to phase-lock the DCO to the reference signal.

5. The RF transceiver of claim 4, further comprising a digital demodulator coupled with the $\Delta\Sigma$PFD, the digital demodulator configured to decode the digitized baseband signal to recover a stream of received data bits.

6. The RF transceiver of claim 1, further comprising:
    a quadrature modulator without a modulation input, coupled with the reference signal source, wherein the reference signal is passed through the quadrature modulator without modulation, and
    wherein the local RF source comprises a digitally-controlled oscillator (DCO) configure to be angle-modulated by a digitized baseband signal.

7. The RF transceiver of claim 6,
    wherein the mixed-signal phase/frequency detector comprises a fractional-N, delta-sigma phase/frequency detector ($\Delta\Sigma$-PFD), configured to frequency divide the angle-modulated local RF signal, wherein the difference signal is derived from comparing zero crossings of the reference signal and zero crossings of the frequency divided, angle-modulated local RF signal, and
    wherein the modulation component comprises the digitized baseband signal and the error component comprises a fractional control sequence.

8. The RF transceiver of claim 7, further comprising:
    a first adder coupled with the $\Delta\Sigma$-PFD, configured to generate a digital frequency error from a difference between the fractional control sequence and a fractional control number;

an accumulator coupled with the first adder, configured to generate a digital phase error from the digital frequency error; and a digital loop filter (DLF) configured to select the digital phase error, wherein the digital phase error is adapted to phase-lock the DCO to the reference signal.

9. The RF transceiver of claim 8, further comprising a digital modulator coupled with the first adder and with a second adder coupled between the DLF and the DCO, the digital modulator configured to encode a sequence of transmit data bits into the digitized baseband signal, wherein the digitized baseband signal from the ΔΣ-PFD is canceled in the first adder by the digitized baseband signal from the digital modulator, and wherein the digitized baseband signal from the digital modulator is added to the digital phase error signal in the second adder to modulate the DCO with the digitized baseband signal.

10. The RF transceiver of claim 9, further comprising a power amplifier (PA) coupled with the DCO, to amplify the signal from the digital baseband modulated DCO.

11. A method in a radio frequency transceiver, comprising:

comparing a reference signal from a reference source to a local radio frequency (RF) signal in a mixed-signal phase/frequency detector;

generating a difference signal from the comparison, the difference signal comprising a modulation component and an error component; and phase-locking the local RF signal to the reference signal with the error component to perform angle demodulation for RF receiving and angle modulation for RF transmitting.

12. The method of claim 11, further comprising:

receiving and downconverting an angle-modulated RF signal to a baseband signal in a receiver front end; and angle-modulating the reference source with the baseband signal to generate an angle-modulated reference signal.

13. The method of claim 12, wherein the mixed signal phase/frequency detector comprises a fractional-N, delta-sigma phase/frequency detector (ΔΣ-PFD) configured to frequency-divide the local RF signal, wherein the difference signal is derived from comparing zero crossings of the angle-modulated reference signal with zero crossings of the frequency-divided local RF signal.

14. The method of claim 13, wherein the modulation component comprises a digitized baseband signal and the error component comprises a fractional control sequence.

15. The method of claim 14, wherein the local RF signal is generated by a digitally-controlled oscillator (DCO), the method further comprising:

generating a digital frequency error from a difference between the fractional control sequence and a fractional control number;

accumulating the digital frequency error to generate a digital phase error; and selecting the digital phase error with a digital loop filter (DLF), wherein phase-locking the local RF signal to the reference signal comprises tuning the DCO with the digital phase error.

16. The method of claim 15, further comprising demodulating the digital baseband signal to recover a stream of received data bits.

17. The method of claim 11, further comprising angle-modulating a local RF signal source with a digitized baseband signal to generate the local RF signal.

18. The method of claim 17, wherein the mixed-signal phase/frequency detector comprises a fractional-N, delta-sigma phase/frequency detector (ΔΣ-PFD) configured to frequency-divide the local RF signal, wherein the difference signal is derived from comparing zero crossings of the reference signal with zero crossings of the frequency-divided, local RF signal, and wherein the modulation component comprises the digitized baseband signal and the error component comprises a fractional control sequence.

19. The method of claim 18, wherein the local RF signal source comprises a digitally-controlled oscillator (DCO), the method further comprising:

generating a digital frequency error from a difference between the fractional control sequence and a fractional control number;

accumulating the digital frequency error to generate a digital phase error; and selecting the digital phase error with a digital loop filter (DLF), wherein phase-locking the local RF signal to the reference signal comprises tuning the DCO with the digital phase error.

20. The method of claim 19, wherein angle-modulating the local RF signal source comprises:

encoding a stream of data bits in a digital modulator to generate the digitized baseband signal;

combining the digitized baseband signal with the digital phase error at a digital control input of the DCO; and tuning the DCO with the digitized baseband signal.

21. The method of claim 20, further comprising:

amplifying the angle-modulated local RF signal; and transmitting the amplified angle-modulated local RF signal.

22. A system, comprising:

a radio frequency (RF) transceiver, comprising:

a reference signal source configured to generate a reference signal;

a local RF source configured to generate a local RF signal; and a mixed-signal phase/frequency detector configured to compare the reference signal to the local RF signal, and to generate a difference signal from the comparison, wherein the difference signal comprises a modulation component and an error component; and an antenna coupled with the RF transceiver to transmit and receive angle-modulated RF signals.

23. The system of claim 22, further comprising:

a receiver front end configured to receive and downconvert an angle-modulated RF signal to a baseband signal; and a quadrature modulator coupled with the receiver front end and the reference signal source, wherein the quadrature modulator is configured to angle-modulate the reference signal source with the baseband signal.

24. The system of claim 23, wherein the mixed-signal phase/frequency detector comprises a fractional-N, delta-sigma phase/frequency detector (ΔΣ-PFD), configured to frequency divide the modulated local RF signal, wherein the difference signal is derived from comparing zero crossings of the reference signal and zero crossings of the frequency divided local RF signal, and wherein the modulation component comprises a digitized baseband signal and the error component comprises a fractional control sequence.

* * * * *